(12) United States Patent
Dufour et al.

(10) Patent No.: US 9,300,562 B2
(45) Date of Patent: Mar. 29, 2016

(54) VALIDATING NETWORK TRAFFIC POLICY

(71) Applicant: JDS Uniphase Corporation, Milpitas, CA (US)

(72) Inventors: André Dufour, Vancouver (CA); Alistair Scott, Lafayette, CO (US)

(73) Assignee: Viavi Solutions Inc., Milpitas, CA (US)

( * ) Notice: Subject to any disclaimer, the term of this patent is extended or adjusted under 35 U.S.C. 154(b) by 176 days.

(21) Appl. No.: 13/971,572

(22) Filed: Aug. 20, 2013

(65) Prior Publication Data
US 2014/0052852 A1 Feb. 20, 2014

Related U.S. Application Data

(60) Provisional application No. 61/691,208, filed on Aug. 20, 2012.

(51) Int. Cl.
*G06F 15/173* (2006.01)
*H04L 12/26* (2006.01)
*H04L 12/24* (2006.01)

(52) U.S. Cl.
CPC ............... *H04L 43/10* (2013.01); *H04L 43/12* (2013.01); *H04L 41/5038* (2013.01)

(58) Field of Classification Search
CPC .............................. H04L 43/10; H04L 43/12
USPC ........................................................ 709/224
See application file for complete search history.

(56) References Cited

U.S. PATENT DOCUMENTS

| | | | |
|---|---|---|---|
| 5,315,580 A | 5/1994 | Phaal | 370/232 |
| 7,058,020 B2 | 6/2006 | Tavana et al. | 370/252 |
| 7,454,494 B1 | 11/2008 | Hedayat et al. | 709/224 |
| 7,508,048 B2 | 3/2009 | Kang et al. | 257/500 |
| 7,512,069 B2 | 3/2009 | Hedayat et al. | 370/230.1 |
| 7,808,915 B2 | 10/2010 | Clark | 370/242 |
| 7,840,670 B2 | 11/2010 | Hedayat et al. | 709/224 |
| 7,869,377 B2 | 1/2011 | Clark | 370/252 |
| 8,072,901 B1 * | 12/2011 | Blair et al. | 370/254 |
| 8,271,633 B2 | 9/2012 | Pyrik et al. | 709/223 |
| 2007/0263775 A1 | 11/2007 | Clark | 379/1.01 |
| 2008/0175266 A1 | 7/2008 | Alperovitch et al. | 370/465 |
| 2009/0013210 A1 | 1/2009 | McIntosh et al. | 714/4.1 |
| 2009/0041011 A1 | 2/2009 | Sheppard | |
| 2009/0097497 A1 | 4/2009 | Smilijanic et al. | 370/458 |
| 2009/0144424 A1 * | 6/2009 | Takeda et al. | 709/226 |
| 2010/0082316 A1 | 4/2010 | Chawla et al. | |
| 2011/0317580 A1 | 12/2011 | Kozisek et al. | 370/252 |
| 2012/0182864 A1 * | 7/2012 | Heinz et al. | 370/221 |

OTHER PUBLICATIONS

EXFO Brix System Spec Sheet, Oct. 2010.
International Search report from corresponding PCT application No. PCT/IB2012/001946, filed Aug. 20, 2013.
(Continued)

*Primary Examiner* — Ario Etienne
*Assistant Examiner* — Sahera Halim
(74) *Attorney, Agent, or Firm* — Harrity & Harrity, LLP (57) ABSTRACT

At least one inline probe is employed to test compliance of a network element with a network traffic policy. The testing capability of the probe is handled by specialized software or hardware. The inline probes hardware can be implemented in network elements such as routers or transceivers. The inline probes can be discovered, registered, and controlled by a dedicated controller disposed at a remote location.

25 Claims, 5 Drawing Sheets

(56) References Cited

OTHER PUBLICATIONS

Labovitz et al., "Internet Inter-Domain Traffic" [online] SIGCOMM'10, Aug. 30-Sep. 3, 2010, New Delhi, India; Copyright 2012 ACM [retrieved on Feb. 26, 2014] Retrieved from the Interned<URL: http://www-bcf.usc.edu/-katzbass/teaching/csci599-sp_13/papers/06/interdomain.pdf>.

Prince, "The ins and outs of evaluating LAN security applicances." [online] ConSentry Networks, Sep. 11, 1006 [retrieved on Feb. 26, 2014] Retrieved from the Internet<URL: http://www.embedded.com/print/4014639>.

Extended European Search Report corresponding to EP 13 83 1291, mailed Jan. 7, 2016, 7 pages.

* cited by examiner

VALIDATING NETWORK TRAFFIC POLICY

CROSS-REFERENCE TO RELATED APPLICATIONS

The present invention claims priority from U.S. Provisional Patent Application No. 61/691,208 filed Aug. 20, 2012, which is incorporated herein by reference.

TECHNICAL FIELD

The present invention relates to communications networks, and in particular to devices and methods for validating traffic policies in communications networks.

BACKGROUND OF THE INVENTION

Network traffic policies are implemented to manage communications network performance, suppress malicious activities such as junk e-mail generation and propagation, ensure adherence to contractual obligations, and the like. The network traffic policies need to be periodically tested or verified to assure service quality.

Brix™ system manufactured by EXFO Inc. having headquarters in Quebec City, Quebec, Canada, includes a plurality of hardware devices called "Brix Verifiers", connected to unused router and switch ports throughout the network, and controlled via software from a remote location. The Brix Verifiers can analyze Voice over IP (VoIP), video, and data streams in the network, gathering network statistics to assure service quality (EXFO Brix System Spec Sheet, October 2010). Detrimentally, Brix Verifiers represent a substantial additional cost for a network operator, making widespread deployment of these devices throughout wide-area networks prohibitively expensive.

Phaal in U.S. Pat. No. 5,315,580 discloses a network monitoring system including a plurality of monitoring devices and a central measurement station connected to free ports of routers in a network. In operation, the monitoring devices sample packets from time to time in a pseudo random manner, and transmit data from the sampled packets to the measurement station for processing and analysis. The random sampling of data packets relaxes the processing power requirement and cost of the monitoring devices and the central measurement station, thus making the overall system less expensive, although the pseudo-random sampling results in only approximate evaluation of the network performance. Furthermore, the monitoring devices of Phaal and Brix Verifiers of the Brix system are not inline devices, so it is not feasible to deploy them without consuming additional router/switch ports.

Telchemy Inc., Duluth, Ga., USA, provides software test agents, which can run on endpoint network devices such as cell phones. A specialized software, running on a dedicated or shared remote computer, presents a real-time dashboard of quality metrics and diagnostic information.

Clark discloses similar systems in US Patent Application Publication 2007/0263775, and in U.S. Pat. No. 7,058,048. In the Clark systems, Voice Quality monitor software agents are installed at endpoints (VoIP terminals) of a communications network. The software agents analyze the arriving VoIP packets to determine VoIP signal quality parameters such as latency and jitter, and generate Quality of Service (QoS) reports. A dedicated Service Management System, connected to the network, collects the QoS reports from the individual software agents, and presents the reports to a network administrator in a summary format.

Detrimentally, the Telchemy system and the Clark systems require the endpoint network devices to be pre-programmed to respond to the test packets generated by the test system software. This consumes network resources, and makes the software agents dependent on the particular vendor's platforms. Furthermore, the Telchemy system and the Clark systems described above are dedicated mostly to testing of VoIP data packets.

Hedayat et al. in U.S. Pat. Nos. 7,840,670 and 7,454,494 disclose a system for testing performance of packet-based networks. In the diagnostic system of Hedayat et al., diagnostic data packets are generated and sent by a diagnostic system coupled to the network under test. The diagnostic data packets travel along a communications path, which includes a plurality of routers. Each router along the path is programmed to send to the diagnostic system response packets that include timestamp, address of the router, etc. The diagnostic system analyzes the response packets from the routers along the path, thereby determining packet jitter, packet loss, and the like. Detrimentally, the diagnostic system of Hedayat et al. relies on a specific router capability or behaviour, and thus has a limited capability of testing specific locations of the network.

SUMMARY OF THE INVENTION

It is a goal of the invention to provide an upgradeable and versatile network test system and method for validating network traffic policies.

The present invention uses inline probes, in which the testing capability is handled by a specialized hardware or software. Due to the inline placement of the probes, the compute, storage, space, power, or memory resources of the network are affected only insignificantly, or even substantially unaffected. The inline probes are controlled by a dedicated controller, which may be disposed at a remote location. The inline probes can be auto-discovered and registered, allowing their gradual installation throughout the network.

Preferably, the inline probes can perform a useful network function, for example the inline probes can operate as network transceivers. Regular transceivers can be gradually replaced by these inline probes, in such a manner that the overall network performance is substantially unaffected. By way of a non-limiting example, the transceivers can decode in real time data packets propagating therethrough. The probe function can be integrated with the transceiver function, to analyze, screen, or measure the propagating data packets in real time. The probe function matches the data of each decoded packet with a remotely programmable target bit pattern. Pattern-matched packets can be analyzed for conformance with a network traffic policy being validated, and/or re-encapsulated and sent to a remote test system for further analysis and/or storage.

In accordance with the invention, there is provided a method for validating a traffic policy installed on a device in a network, the method comprising:
 (a) providing in the network a first inline probe;
 (b) generating at the at least first inline probe test traffic based on the policy being validated;
 (c) transmitting the test traffic generated in step (b) from the first inline probe to the device, wherein the device transmits post-device traffic in response to receiving the transmitted test traffic;
 (d) receiving the post-device traffic of step (c); and
 (e) testing the post-device traffic received in step (d) to determine whether the traffic policy is enforced on the device.

In accordance with the invention, there is further provided a system for validating a traffic policy installed on a device in a network, the system comprising:

first and second inline probes for placement in the network; and a controller in communication with the at least first and second inline probes;

wherein the controller is configured to cause the first or the second inline probe to generate test traffic based on the policy being validated, and to cause the first or the second inline probe to transmit the generated test traffic to the device, wherein the device transmits post-device traffic in response to receiving the transmitted test traffic;

wherein the controller is further configured to cause the first or the second inline probe to receive the post-device traffic and to analyze the post-device traffic to determine whether the traffic policy is enforced on the device, and/or to cause the first or the second inline probe to forward the post-device traffic to a remote location for such determination.

In accordance with another aspect of the invention, there is further provided a network transceiver for validating a traffic policy installed on a device in the network. The transceiver includes a package, such as Small Form Pluggable (SFP) package, and a microcontroller or equivalent programmable processing capability within the package. The microcontroller is configured to generate test traffic based on the policy being validated, and transmit the test traffic to the device, to cause the device to transmit post-device traffic that can be analyzed by a downstream transceiver. The microcontroller is also configured to receive and test post-device traffic generated by the device in response to test traffic received by the device from this or another network transceiver, to determine if the traffic policy is enforced on the device.

BRIEF DESCRIPTION OF THE DRAWINGS

Exemplary embodiments will now be described in conjunction with the drawings, in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 1:
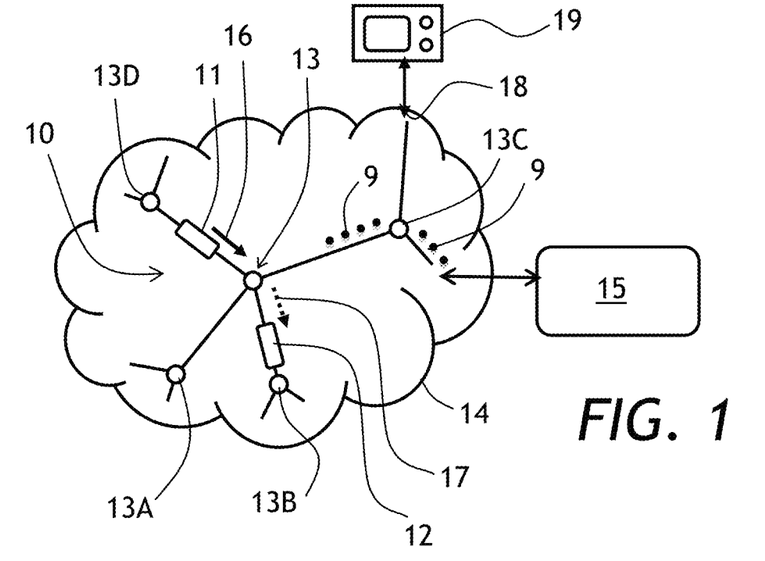
FIG. 1 is a diagram of a communications network and a system for validating a network traffic policy according to the invention.

Referring to FIG. 1, a network 14 includes a system 10 for active validation of a traffic policy in the network 14. The network 14 includes network devices 13A, 13B, 13C, and 13D, and a device under test 13. The network devices 13, 13A, 13B, 13C, and 13D can be routers, for example.

The system 10 includes a first inline probe 11 disposed in the network 14 upstream of the device under test 13, a second inline probe 12 disposed in the network 14 downstream of the device under test 13, and a controller 15 in communication with the first 11 and second 12 inline probes, for example by exchanging control packets 9 between the controller 15 and the probes 11 and 12 through the network 14.

The controller 15 is configured to cause the first inline probe 11 to generate test traffic 16 based on the network policy being validated, and to cause the first inline probe 11 to transmit the generated test traffic 16 to the device 13. In response to receiving the transmitted test traffic 16, the device 13 transmits post-device traffic 17. The controller 15 is configured to cause the second inline probe 12 to receive the post-device traffic 17, to measure, test, or analyze the post-device traffic 17 to determine if the traffic policy is enforced on the device 13, and/or to forward the post-device traffic 17 to a remote location 18 of the network 14 for such determination. It is noted that the terms "downstream" and "upstream" are used herein with respect to the direction of flow of the test traffic 16 and the post-device traffic 17.

A tester 19 can be disposed at the remote location 18 for measuring or analyzing the post-device traffic 17 forwarded by the second inline probe 12. The tester 19 may or may not be integrated with the controller 15 into a single device at a single location, for example at the location of the controller 15, or at the remote location 18 of the tester 19. The test traffic 16 and/or the control packets 9 are preferably sent during idle times on the in-service network 14, to avoid impacting useful transmission bandwidth of the network 14, and to prevent packet loss of customer's traffic in the network 14.

The first and second inline probes 11 and 12 are preferably hardware-based probes including a microcontroller, not shown, for example an Application-Specific Integrated Circuit (ASIC) configured for generating and/or measuring traffic upon receiving corresponding commands from the controller 15. Preferably, the first and second probes 11 and 12 are implemented in hardware of standard network devices, for example routers or transceivers, the probe function being implemented as an additional function of the routers or transceivers. The first and second probes 11 and 12 can also be based on software or embedded software/firmware. In one embodiment, the post-device traffic 17 is directed not to the second 12 but to the first inline probe 11 for redirection and/or analysis, for example for testing whether a policy has been implemented on the device 13.

Figure 2:
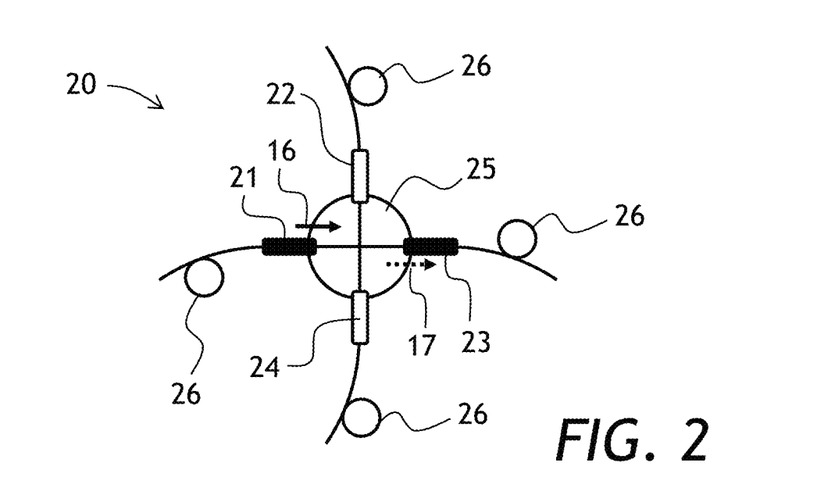
FIG. 2 is a diagram of a network router including four transceivers.

Referring to FIG. 2, a router 20 includes a routing electronic core 25 and four optoelectronic transceivers 21, 22, 23, and 24 connected to the routing core 25. Optical fibers 26 connect the transceivers 21 to 24 to an optical network, not shown. The first and third transceivers 21 and 23 have the probe functionality of the first and second probes 11 and 12, respectively, while the second and fourth transceivers 22 and 24 are regular transceivers not having the probe functionality. The first and third transceivers 21 and 23 can perform the regular transceiver function just as well as the second and fourth transceivers 22 and 24. In other words, the performance of the optoelectronic transceivers 21 to 24 is indistinguishable, as far as regular network functions are concerned. However, the probe function, which is preferably implemented in the hardware of the first and third transceivers 21 and 23, allows one to remotely test compliance of the routing electronic core 25 with a network traffic policy, by causing the first transceiver 21 to generate the test traffic 16, and causing the second transceiver to analyze the post-device traffic 17 to determine whether the traffic policy is enforced on the routing electronic core 25. To avoid impacting useful bandwidth of the network 14, the test traffic 16 can be generated during idle time of the routing core 25, that is, when no regular traffic is received.

Figure 3:
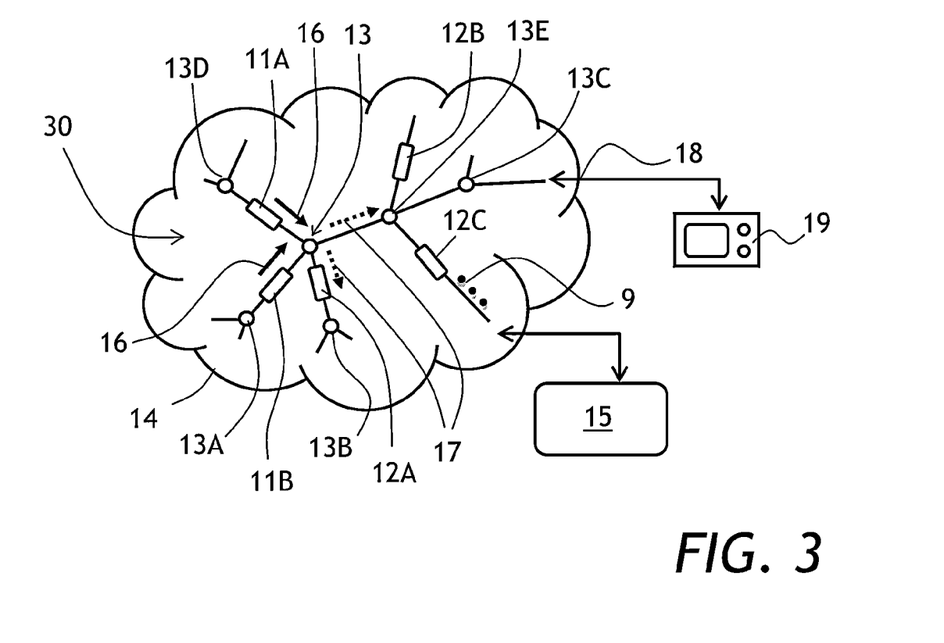
FIG. 3 is a diagram of a communications network and a system for validating a network traffic policy having multiple inline probes upstream and downstream of a network device under test.

Turning to FIG. 3 with further reference to FIG. 1, a system 30 is similar to the system 10 of FIG. 1. The system 30 of FIG. 3 includes not one but a plurality of first inline probes 11A and 11B, and not one but a plurality of second inline probes 12A, 12B, and 12C. The system 30 also includes one extra network device 13E, in addition to the network devices 13A to 13D. The first and second inline probes 11A, 11B, 12A, and 12B are preferably hardware-implemented probes.

The controller 15 is configured to cause the first inline probes 11A and 11B to generate the test traffic 16. The test traffic 16 can include test packets directed through the device under test 13. The test packets include header and payload, which can be selected by a user of the system 30 through the controller 15. The controller 15 is further configured to cause the post-device traffic 17 to be received at the plurality of second inline probes 12A to 12C. The system 30 of FIG. 3 enables more sophisticated tests, in which the device under test 13 receives the test packets 16 from not one but a plurality of sources. Using the plurality of second inline probes 12A to 12C increases the probability of the post-device traffic 17 to be intercepted, and allows the second inline probes 12A to 12C to be placed farther away from the device under test 13. Similar to the system 10 of FIG. 1, the system 30 of FIG. 3 can include the tester 19 disposed at the remote location 18 of the network 14 for analyzing the post-device traffic 17 forwarded by plurality of the second inline probes 12A to 12C. The network 14 in the systems 10 and 30 of FIGS. 1 and 3, respectively, can include a virtual network function (VNF). The systems 10 and 30 can be used to test the VNF of the network 14. To that end, the probes 11A, 11B, 12A, and/or 12B can include hardware modules, software modules, or a mixture of hardware and software modules.

Figure 4:
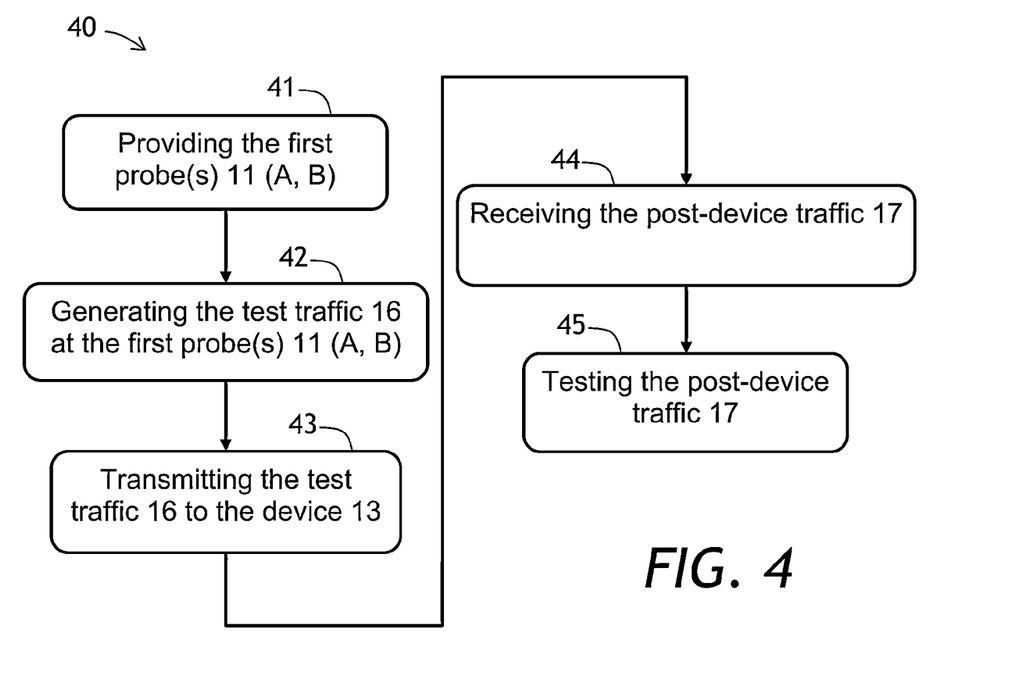
FIG. 4 is a flow chart of a method for validating a traffic policy using the system of FIG. 1 or FIG. 3.

Referring to FIG. 4 with further reference to FIGS. 1 to 3, a method 40 for validating a traffic policy installed on the network 14 using the test system 10 of FIG. 1 is illustrated. The test system 10 is, of course, used only as an example; the method 40 is equally applicable to the router 20 of FIG. 2, or the test system 30 of FIG. 3. In a step 41 of the method 40, the first inline probe 11 is installed upstream of the device under test 13, and a second inline probe 12 is optionally installed downstream of the device under test 13. For example, first and third regular transceivers of the router 20 of FIG. 2 can be replaced with the first and third transceivers 21 and 23 having the test probe functionality implemented in hardware, to test compliance of the routing electronic core 25 with a network traffic policy, as explained above.

Still referring to FIG. 4 with further reference to FIG. 1, in a step 42, the test traffic 16 is generated at the first inline probe 11 based on the policy being validated. The test traffic 16 is transmitted from the first probe 11 to the device under test 13. In response to receiving the transmitted test traffic 16, the device under test 13 transmits the post-device traffic 17 in a step 43. In a step 44, the post-device traffic 17 is received at the second inline probe 12 or, for some tests, it is received back at the first inline probe 11. Finally, in a step 45, the post-device traffic 17 received at the first 11 or second 12 inline probe is tested to determine whether the traffic policy is enforced on the device under test 13. The testing can be performed either locally, that is, at the first 11 or second 12 inline probe, or remotely, at the tester 19, by re-sending the post-device traffic 17 to the remote location 18. The post-device traffic 17 can be re-sent by encapsulating and forwarding the post-device traffic 17 to the tester 19 at the remote location 18 for subsequent analysis and/or storage. The second to fifth steps 42 to 45 can be periodically repeated, to test the device 13 at regular time intervals for compliance with the traffic policy.

Figure 5:
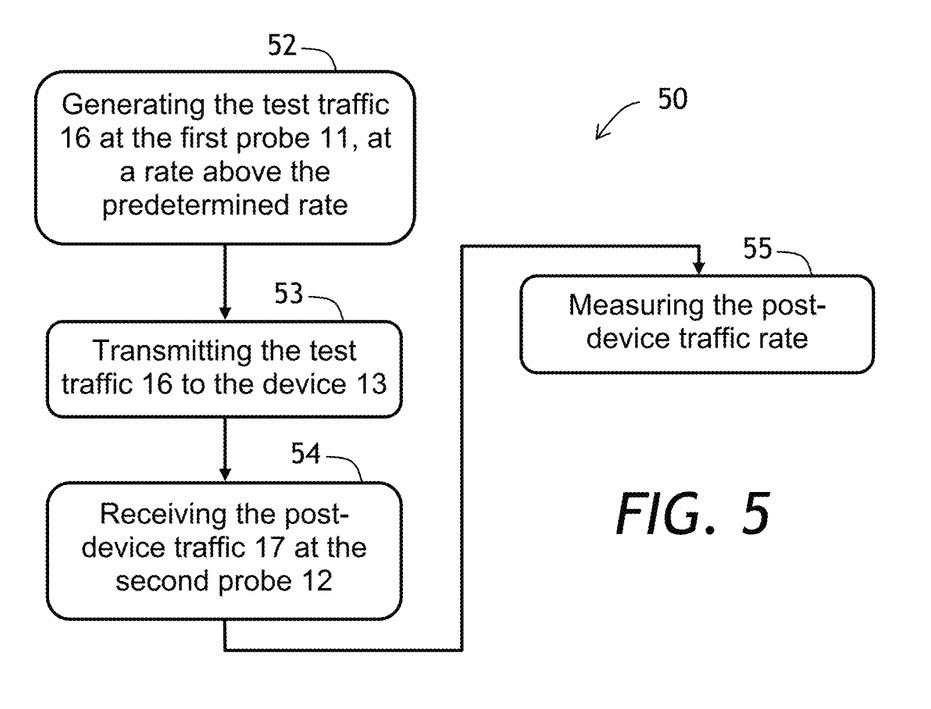
FIG. 5 is a flow chart of a method for validating a bandwidth limiting policy in accordance with the invention.

Specific examples of network traffic policies will now be given in application to the network 14 of FIG. 1. The method 40 of FIG. 4 will be used as a general method in these specific examples. Turning to FIG. 5 with further reference to FIGS. 1 and 4, a method 50 for testing a compliance of the device 13 with a traffic policy of limiting a transmission rate of traffic is presented. Similar reference numerals in FIGS. 4 and 5 denote similar steps.

In a step 52 of the method 50 of FIG. 5, the test traffic 16 is generated by the first probe 11 at a rate above the predetermined rate. In a step 53, the test traffic 16 is transmitted from the first probe 11 to the device under test 13. In a step 54, the post-device traffic 17 is received at the second probe 12. Finally, in a step 55, the second probe 12 determines whether the post-device traffic 17 is transmitted above the predetermined rate. The step 55 can also be performed remotely, at the tester 19.

The traffic-limiting policy can be applied selectively to a particular type of traffic. To validate such selective traffic-limiting policy, the step 52 can include generating the test traffic 16 of a particular type, for example, video traffic, at the rate above the predetermined rate. Accordingly, the step 55 in this case should include determining whether the post-device traffic 17 of the particular type is transmitted above the predetermined rate. For example, when the traffic policy limits MPEG-2 TS traffic not to exceed 8 MB/s, the test traffic 16 can include MPEG-2 TS traffic at a rate exceeding 8 MB/s, for example, 10 MB/s.

Figure 6:
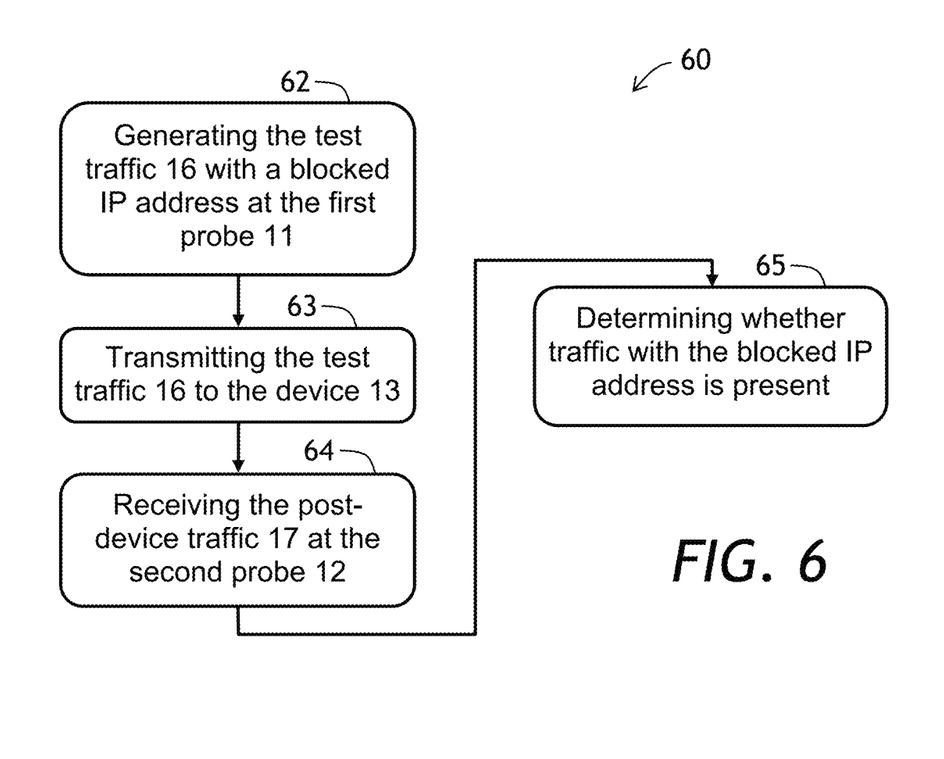
FIG. 6 is a flow chart of a method for validating IP destination address blocking policy in accordance with the invention.

Turning to FIG. 6 with further reference to FIGS. 1 and 4, a method 60 is presented for testing a compliance of the device 13 with a traffic policy of blocking traffic including packets with a specific destination IP address. Similar reference numerals in FIGS. 4 and 6 denote similar steps.

In a step 62 of the method 60 of FIG. 6, the test traffic 16, including test packets with the specific destination IP address, is generated. In a step 63, the test traffic 16 is transmitted from the first probe 11 to the device under test 13. In a step 64, the post-device traffic 17 is received at the second probe 12. Finally, in a step 65, the second probe 12 determines whether the post-device traffic 17 includes any of the test packets with the specific destination IP address. The step 65 can also be performed remotely, at the tester 19.

There are, of course, many other variants of the method 40 of FIG. 4. For example, the second step 42 of generating the test traffic 16 can include generating traffic not subject to the traffic policy, and the fifth step 45 of testing the post-device traffic 17 can include determining whether the generated test traffic 16 was modified by the device under test 13. In this way, one can determine whether the network traffic policy with respect to traffic of a particular type impacts traffic of other type, that was not supposed to be impacted. Other variants of the method 40 of FIG. 4 may include applying one or more of multiple criteria implemented in a network policy, including time of day, network loading, subscriber service eligibility, subscriber usage, resource availability, source address, network port number, and the like. For example, the bandwidth limitation may apply only at certain time of day. Furthermore, different subscriber plans may include different limitations on the bandwidth, e.g. video bandwidth.

The methods 40, 50, and 60 of FIGS. 4, 5, and 6, respectively, can be implemented in such a manner as to not affect regular network traffic in a substantial way, for example not cause a packet loss of the regular network traffic. In one embodiment, the third step 43 of transmitting the test traffic 16 is conducted during an idle time on regular network traffic. In another embodiment, the test traffic 16 is limited to not exceed a configurable rate, for example 10% of a link bandwidth between the first 11 and second 12 inline probes. In yet another embodiment, the third step 43 of transmitting the test traffic 16 is conducted only when bandwidth utilization in a link between the first 11 and second 12 inline probes is below a configurable threshold, for example 80%.

Figure 7:
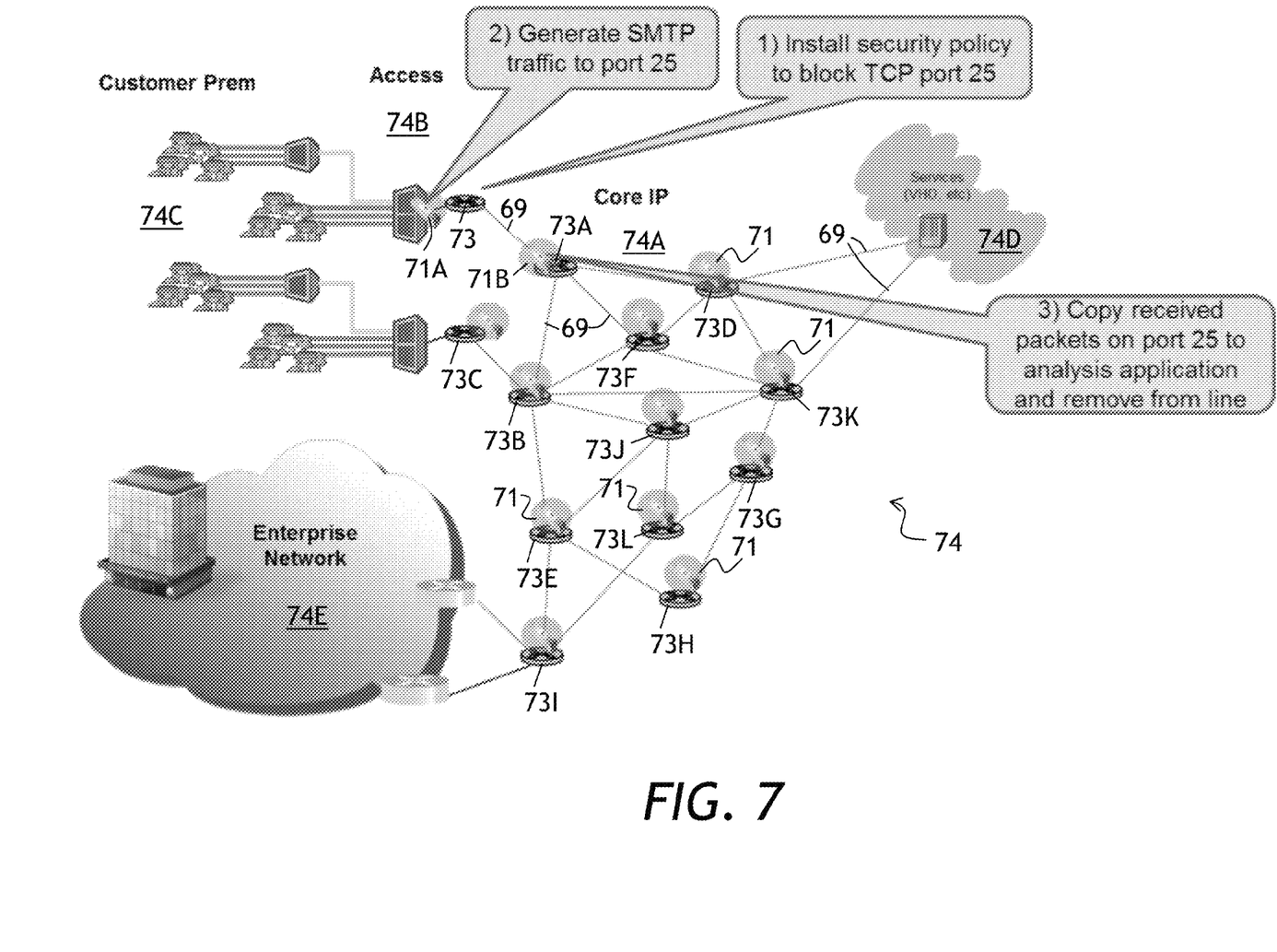
FIG. 7 is a diagram of a communications network, a traffic policy validation system of the invention installed in the network, and method steps for installation an verification of a traffic policy for blocking an SMTP port.

Specific examples of the test systems 10 and 30 of FIGS. 1 and 3 will now be considered. Turning to FIG. 7 with further reference to FIGS. 1, 2, and 6, an IP network 74 includes a core IP section 74A, an access section 74B connected to customer premises 74C, a services section 74D for providing Video Hub Office (VHO) and other services, and an enterprise network 74E. The core IP section 74A is comprised of an edge routers 73 and 73C, and core routers 73A, 73B, 73D, 73E, 73F, 73G, 73H, 73I, 73J, 73K, and 73L. The routers 73 and 73A to 73L are similar to the routers 20 of FIG. 2, that is, they include a routing core, shown with a cylinder with an "X" on top, and a plurality of optoelectronic transceivers 71, 71A, 71B for coupling the routers 73 and 73A to 73L via optical fiber links 69. The optoelectronic transceivers 71, 71A, and 71B are SFP transceivers having a hardware-implemented test capability of the first 11 and second 12 inline probes of the system 10 of FIG. 1, according to the method 60 of FIG. 6. A detailed structure of the optoelectronic transceivers 71, 71A, and 71B will be considered further below.

To prevent unauthorized Simple Mail Transfer Protocol (SMTP) traffic commonly generated by malware, a policy is installed by a network operator on the edge router 73 to block traffic destined to TCP port No. 25, commonly used as the SMTP port. This step is denoted with "1)" in FIG. 7.

Traffic is generated using the inline hardware probe 71A on the subscriber side of the edge router 73 (left side in FIG. 7) having a destination IP address on the core side of the edge router 73 (right side in FIG. 7) and addressed to TCP port No. 25. This step, denoted with "2)" in FIG. 7, corresponds to the generating step 62 of FIG. 6.

The inline hardware probe 73B on the core side of the edge router 73 monitors the link for traffic destined to TCP port 25, counting TCP segments bearing this signature, or copies them to an external measurement instrument, such as the tester 19 of the test system 10 shown in FIG. 1. The segments are not forwarded any further. This step, denoted with "3)" in FIG. 7, corresponds to the determining step 65 of the method 60 of FIG. 6. If any such segments are received, the network operator can conclude that the security policy has not been correctly implemented on the edge router 73.

The above security policy validation can be implemented on a larger scale, where a security policy is installed on the core routers 73A, B and 73D through 73L, and validated using inline transceivers/probes 71 deployed extensively throughout the network 74, using any of the methods 40, 50, or 60 of FIGS. 4, 5, and 6, respectively.

The network operator may periodically validate that security policies are enforceable and are still in effect. Furthermore, the network operator may use the inline transceivers/probes 71 to generate and measure traffic that is not subject to the security policy, to ensure that the traffic is still able to traverse the core routers 73A through 73L with acceptable QoS properties.

To limit the bandwidth consumed by a particular type of traffic, for example video streaming, a network operator can install a policy on the edge router 73 to rate-limit a particular vireo stream, for example the MPEG-2 Transport Stream traffic mentioned above, to 8 Mb/s. To test this policy, the MPEG-2 TS traffic can be generated at a rate higher than 8 Mb/s using the nearby hardware probes 71A or 71B. The other one of the hardware probes 71A or 71B, disposed downstream of the MPEG-2 TS traffic, monitors the link for MPEG-2 TS traffic, and measures the arrival rate of packets bearing this signature, or copies them to an external measurement instrument, not shown in FIG. 7. If the rate is higher than 8 Mb/s, the traffic shaping policy is not being correctly implemented.

The test traffic can be generated from virtually any point of the network 74, by any one of the hardware probes 71, 71A, and 71B, and measured at virtually any other point, in a way that does not use software agents installed on the routers 73 and 73A . . . 73L. Thus, valuable computation and packet routing capabilities of the network 74 are substantially unaffected by the network policy verification.

Figure 8:
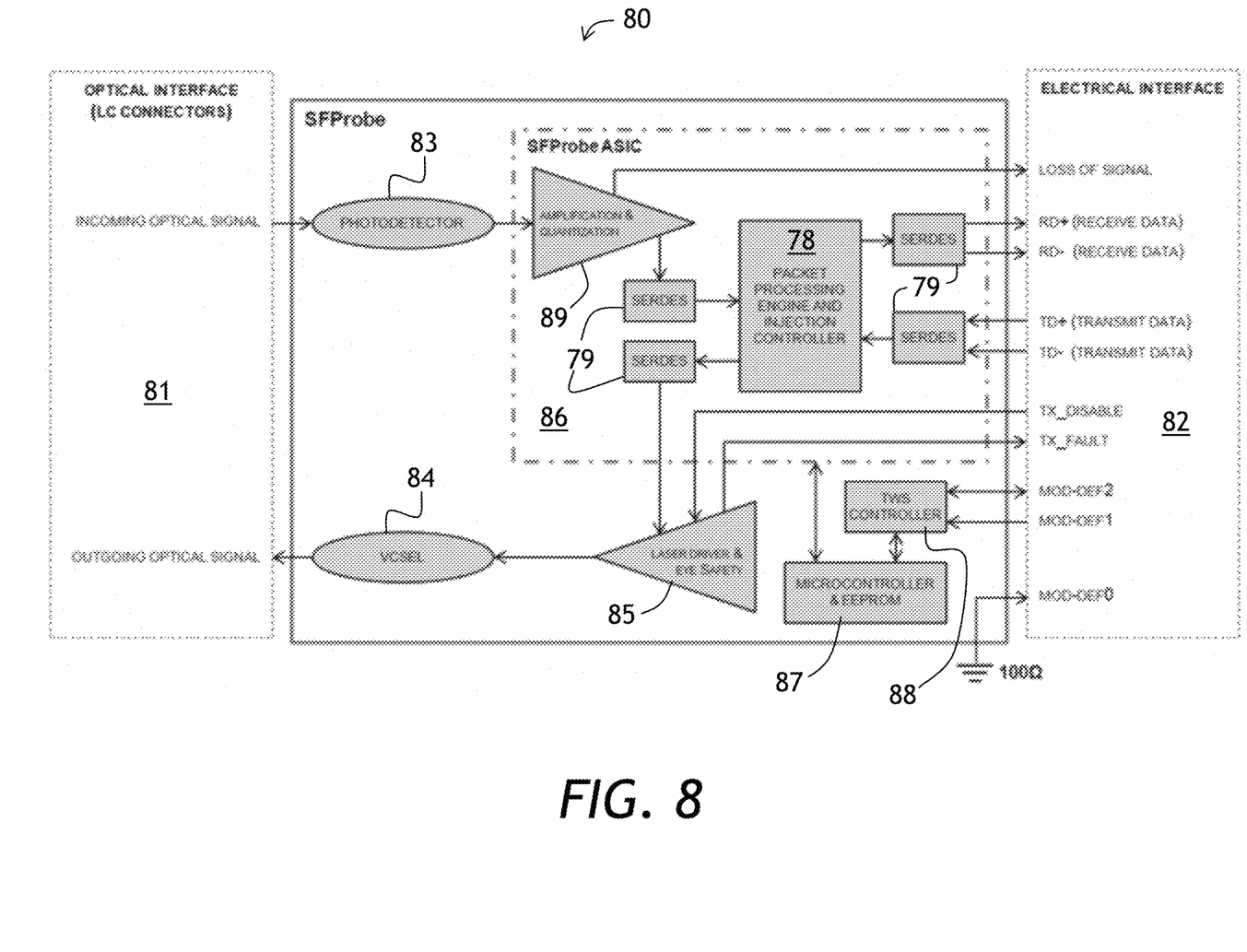
FIG. 8 is a block diagram of an inline hardware probe of the invention.

Turning now to FIG. 8 with further reference to FIGS. 4 to 7, an optoelectronic SFP transceiver, or "SFProbe" 80 can be used as the transceiver 71, 71A, and 71B in the network 74 of FIG. 7. The SFProbe 80 has an optical interface 81 and an electrical interface 82. The SFProbe 80 includes a photodetector 83 for receiving optical signals from the optical interface 81, a vertical cavity surface-emitting laser (VSCEL) 84 for outputting optical signals to the optical interface 81, a laser driver 85 for driving the VSCEL 84, an ASIC 86, a general microcontroller 87, and a modulation (TWS) controller 88. The ASIC 86 is constructed to perform real-time serialization-deserialization of the incoming and outgoing signals, and real-time matching of the incoming/outgoing bit patterns to a remotely selectable bit pattern. To that end, the ASIC 86 includes an amplification/quantization unit 89, serializers/deserializers (SERDES) 79 and a packet processing engine and injection controller 78. The ASIC 86 allows the SFProbe 80 to inspect packets and frames flowing through the SFProbe 80 to perform the test probe functions described above with respect to the methods 40, 50, and 60 of FIGS. 4, 5, and 6, respectively, by detecting and/or matching network packet parameter values from the packet header and/or packet payload. This function is realized in addition to, and without consuming resources from, the regular transceiver function. This ensures gradual and seamless upgradeability of the network 74 of FIG. 7 with the SFProbes 80 replacing regular transceivers, not shown. Other inline network elements having similar architecture as the SFProbe 80, can also be used to validate a network policy according to the invention.

The hardware used to implement the various illustrative logics, logical blocks, modules, and circuits described in connection with the aspects disclosed herein may be implemented or performed using not only an ASIC but also using a general purpose processor, a digital signal processor (DSP), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, the various logic blocks and modules described herein may be implemented in software and/or firmware.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
generating, by at least one inline probe device, test traffic based on a traffic policy being tested;
transmitting, by the at least one inline probe device, the test traffic to a device,
the device transmitting post-device traffic based on receiving the test traffic;
receiving, by the at least one inline probe device, the post-device traffic from the device;
matching, by the at least one inline probe device, data included in the post-device traffic with a remotely programmable target bit pattern,
the remotely programmable target bit pattern being determined by a controller device located remotely from the at least one inline probe device; and
causing, by the at least one inline probe device, testing of the post-device traffic to determine whether the traffic policy is enforced on the device based on matching the data included in the post-device traffic with the remotely programmable target bit pattern.

2. The method of claim 1, where the at least one inline probe device comprises an inline hardware probe.

3. The method of claim 1, where the at least one inline probe device includes a first inline probe device and a second inline probe device,
where the generating the test traffic and the transmitting the test traffic are performed by the first inline probe device, and
where the receiving the post-device traffic and the matching the data are performed by the second inline probe device,
the first inline probe device being disposed upstream of the device, and
the second inline probe device being disposed downstream of the device and disposed upstream of an endpoint device.

4. The method of claim 3, wherein the second inline probe device comprises an Application-Specific Integrated Circuit (ASIC) configured to perform real-time matching of the data included in the post-device traffic with the remotely programmable target bit pattern.

5. The method of claim 3, where transmitting the test traffic comprises:
transmitting the test traffic to not exceed a configurable threshold of a link bandwidth between the first inline probe device and the second inline probe device.

6. The method of claim 5, where the configurable threshold is 10%.

7. The method of claim 3, where transmitting the test traffic comprises:
transmitting the test traffic only when utilization of a link bandwidth between the first inline probe device and the second inline probe device is below a configurable threshold.

8. The method of claim 7, where the configurable threshold is 80%.

9. The method of claim 3, where causing testing comprises:
analyzing the post-device traffic at the second inline probe device, and
communicating results of the analysis to the controller device.

10. The method of claim 1, where the at least one inline probe device includes a plurality of first inline probe devices and a plurality of second inline probe devices,
where the generating the test traffic and the transmitting the test traffic are performed by the plurality of first inline probe devices, and
where the receiving the post-device traffic and the matching the data are performed by the plurality of second inline probe devices,
the plurality of first inline probe devices being disposed upstream of the device, and
the plurality of second inline probe devices being downstream of the device and upstream of an endpoint device.

11. The method of claim 1, where the traffic policy comprises limiting a transmission rate of traffic to not exceed a predetermined rate;
where transmitting the test traffic comprises:
transmitting the test traffic at a rate above the predetermined rate; and
where causing testing comprises:
determining whether the post-device traffic is transmitted above the predetermined rate.

12. The method of claim 1, where the traffic policy comprises limiting a transmission rate of a particular data type to not exceed a predetermined rate;
where generating the test traffic comprises:
generating the test traffic of the particular data type;
where transmitting the test traffic comprises:
transmitting the test traffic at a rate above the predetermined rate; and
where causing testing comprises:
determining whether the post-device traffic of the particular data type is transmitted above the predetermined rate.

13. The method of claim 12, where the particular type of traffic includes video traffic.

14. The method of claim 1, where the traffic policy comprises blocking traffic including packets with a selected destination IP address;
where generating the test traffic comprises:
generating the test traffic to include test packets with the selected destination IP address; and
where causing testing comprises:
determining whether the post-device traffic includes any of the test packets.

15. The method of claim 14, where the traffic policy includes criteria associated with at least one of:
a time of day,
a network loading,
a subscriber service eligibility,
a subscriber usage,
a resource availability,
a source address, or
a network port number.

16. The method of claim 1, where generating the test traffic comprises:
generating traffic not subject to the traffic policy, and
where causing testing comprises:

determining whether the traffic not subject to the traffic policy was modified by the device.

17. The method of claim 1, where transmitting the test traffic comprises:
   transmitting the test traffic during an idle time on regular network traffic.

18. The method of claim 1, where causing testing comprises:
   encapsulating and forwarding the post-device traffic to a remote device for subsequent measurement, analysis, and/or storage.

19. The method of claim 1, where the device is included in a network that comprises a virtual network function.

20. The method of claim 1, where generating the test traffic comprises:
   generating the test traffic based on test packet information received from the controller device.

21. At least one inline probe device comprising:
   at least one processor configured to:
      generate test traffic based on a traffic policy to be tested;
      transmit the test traffic to a network device,
         the network device transmitting post-device traffic based on receiving the test traffic;
      receive the post-device traffic from the network device;
      match data included in the post-device traffic with a remotely programmable target bit pattern,
         the remotely programmable target bit pattern being determined by a controller device located remotely from the at least one inline probe device; and
      cause testing of the post-device traffic to determine whether the traffic policy is enforced on the network device based on matching the data included in the post-device traffic with the remotely programmable target bit pattern.

22. The at least one inline probe device of claim 21, where the at least one processor, when causing testing of the post-device traffic, is configured to:
   test the post-device traffic.

23. A controller device comprising:
   at least one processor configured to:
      determine test packet information to be used to test a traffic policy;
      cause a first inline probe device to generate test traffic based on test packet information,
      cause the first inline probe device to transmit the test traffic to a test device,
         the test device transmitting post-device traffic to a second inline probe device based on receiving the test traffic;
      send information identifying a target bit pattern to the second inline probe device;
      cause the second inline probe device to match data included in the post-device traffic with the target bit pattern; and
      cause the second inline probe to analyze the post-device traffic to determine whether the traffic policy is enforced on the test device,
         the post-device traffic being analyzed based on matching the data included in the post-device traffic with the target bit pattern.

24. The controller device of claim 23, where the target bit pattern is associated with network packet parameter values from a header of a data packet.

25. The controller device of claim 23, where the at least one processor is further configured to:
   automatically discover and register the first inline probe device and the second inline probe device.

* * * * *